Patented Aug. 12, 1952

2,606,905

UNITED STATES PATENT OFFICE

2,606,905

METHOD FOR PREPARING FOLIC ACID INTERMEDIATES

Barney J. Magerlein and David I. Weisblat, Kalamazoo, Mich., assignors to The Upjohn Company, Kalamazoo, Mich., a corporation of Michigan No Drawing. Application August 19, 1950, Serial No. 180,502

3 Claims. (Cl. 260—251.5)

This invention relates to a method for the preparation of N-((2 - amino - 4 - hydroxy -6 - pteridyl) -methyl) -p-aminobenzoate compounds and to certain intermediates useful in the method.

The N - ((2 - amino - 4- hydroxy - 6 - pteridyl) - methyl) -p-aminobenzoate compounds (I) which can be prepared by the method of the invention have the generic formula

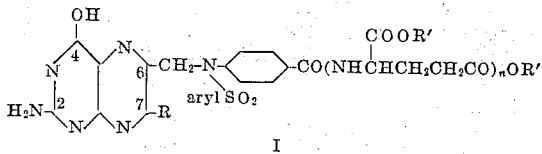

I

N-((2-amino-4-hydroxy-6-pteridyl)-methyl)-p-aminobenzoate compound wherein R' is a member of the class consisting of hydrogen and the alkyl radicals, $n$ is a member of the class consisting of zero and the positive integers 1 to 7, inclusive, and R is a member of the class consisting of hydrogen and the alkyl radicals. They thus include the arylsulfonyl derivatives of pteroic acid, of pteroylglutamic acid and of the pteroylglutamylglutamic acids having up to seven glutamic acid residues in the molecule, and of their alkyl esters as well as alkyl substitution products thereof having an alkyl substituent on the 7 carbon atom of the pterine nucleus. In the structural formulae given herein and in the appended claims aromatic nuclei are represented by one or more simple hexagons.

In the naming of compounds having the generic formula given, certain of which are described and claimed in copending application, Serial No. 41,882, filed July 31, 1948, now Patent No. 2,558,711, and of other starting and intermediate compounds mentioned herein where both a glutamic acid residue and a p-amino-benzoic acid residue are included in the molecule, the nitrogen atom of the glutamic acid residue is, for convenience, herein referred to by the symbol "N'" and the nitrogen atom of the p-aminobenzoic acid residue is referred to by the symbol "N." As indicated by the generic formula given, compounds used in or prepared by the process of the invention which contain more than one glutamic acid or ester residue are those wherein only the gamma carboxyl groups of the glutamic acid residues are involved in the peptide linkages. Preferred compounds used in or prepared by the method of the invention are those wherein $n$ of the generic formula given, and in those given subsequently, is 1, i. e. those containing one glutamic acid or ester residue, and the method and intermediate compounds will be described with particular reference thereto, it being understood, however, that the invention is not limited thereby.

Compounds having the generic formula (I) and compounds useful as intermediates in the preparation thereof, are of particular value due to the relationship of certain of the former with, and to the ease with which they can be converted to, compounds similar to or identical with certain naturally occurring compounds of the folic acid group. Thus, diethyl N'-(N-((2-amino - 4-hydroxy-6-pteridyl) -methyl) -N-(p-toluene - sulfonyl) - p - aminobenzoyl) - 1-glutamate, which can be prepared by reacting 2,4,5-triamino-6-hydroxyprimidine with diethyl N' - (N - (2 - keto - 3 - oximinopropyl) - N-(p-toluenesulfonyl) -p-aminobenzoyl) -glutamate according to the method of the invention, can be converted readily by hydrolysis of the two ethyl ester groups with alkali to the corresponding dicarboxylic acid compound and the latter, by splitting the p-toluenesulfonyl radical from the molecule with hydrogen bromide and a bromine acceptor in an aliphatic acid medium according to the method described and claimed in copending application, Serial No. 41,883, filed July 31, 1948, now Patent No. 2,562,222, can be converted readily to a pteroyl-glutamic acid which is generally accepted as being identical with vitamin Bc from liver or the "L. casei factor." The order of the hydrolysis step and the splitting of the arylsulfonyl radical can be reversed, if desired.

Compounds having the generic formula given in which the glutamic acid residues have the 1 (+) configuration are of particular interest because of the existence of glutamic acid residues having the same configuration in folic acid compounds isolated from natural sources. The method of the invention and the intermediate compounds to be described are, however, not limited as to the configuration of the glutamic acid residues involved.

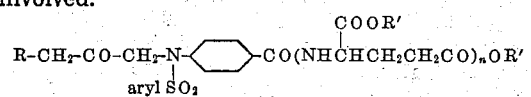

II

N-(2-ketoalkyl)-p-aminobenzoate compound

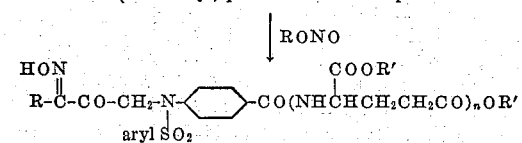

III

N-(2-keto-3-oximinoalkyl)-p-aminobenzoate compound

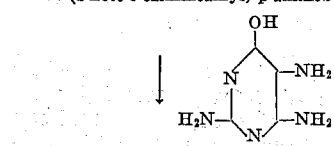

IV 2,4,5-triamino-6-hydroxypyrimidine

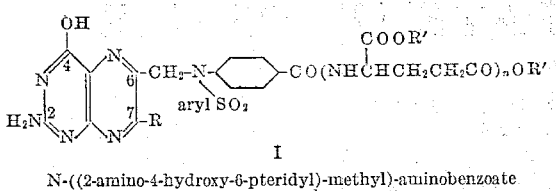

N-((2-amino-4-hydroxy-6-pteridyl)-methyl)-aminobenzoate compound

According to the method of the invention, as illustrated in the accompanying reaction chart wherein $n$, R and R' have the values given previously, an N-((2-amino-4-hydroxy-6-pteridyl)-methyl)-p-aminobenzoate compound having the formula (I) is prepared readily by reacting 2,4,5-triamino-6-hydroxypyrimidine (IV) with an N - (2 - keto - 3 - oximinoalkyl) - p - aminobenzoate compound having the formula (III). The latter compound can be prepared readily by reacting an alkyl nitrite in either an acid or an alkaline medium, preferably in an acid medium, with an N-(2-keto-alkyl)-p-aminobenzoate compound having the formula (II).

It is to be noted that when the 2-keto-3-oximinoalkyl radical of the N-(2-keto-3-oximinoalkyl)-p-aminobenzoate compound (III) contains more than three carbon atoms, i. e. when R of the formulae given is an alkyl radical, the N - ((2 - amino - 4 - hydroxy - 6 - pteridyl) - methyl)-p-aminobenzoate compound (I) formed is an N-((2-amino-4-hydroxy-7-alkyl-6-pteridyl)-methyl)-p-aminobenzoate compound, there being an alkyl substituent in the 7 position of the pterine nucleus. Such N-((2-amino-4-hydroxy - 7 - alkyl - 6 - pteridyl) - methyl) - p - aminobenzoate compounds have not been described heretofore. The alkyl substituted folic acids which can be prepared from them appear to be of considerable interest from a physiological standpoint.

The N-(2-keto-3-oximinoalkyl)-p-aminobenzoate compounds (III) with which the invention is concerned are herein disclosed for the first time. Their value is apparent from the foregoing and ensuing disclosure.

The reaction of an alkyl nitrite with an N-(2-ketoalkyl)-p-aminobenzoate compound to form an N-(2-keto-3-oximinoalkyl)-p-aminobenzoate compound can be carried out conveniently by dissolving the compounds in an organic liquid containing either an acid or an alkaline catalyst. A variety of organic liquids can be employed, such as dioxane, diethyl ether, alcohol, tetrahydrofurane and the like. An organic liquid is preferably chosen in which the acid or alkaline catalyst is at least somewhat soluble. Ethereal solutions of hydrogen chloride and alcoholic solutions of alkali metal alcoholates have been used with satisfaction. Other acids and other alkaline substances can, however, be used, if desired.

Alkyl nitrites which can be used include n-butyl nitrite, tertiary-butyl nitrite, iso-octyl nitrite, ethyl nitrite and the like. Substantially one mole, or somewhat more, of an alkyl nitrite is used for each mole of ketoalkyl compound. The reaction mixture is generally allowed to stand at room temperature for from 6 to 12 hours, but higher temperatures can be employed if desired and the reaction time shortened accordingly.

When an acid catalyst is used to promote the reaction of an alkyl nitrite with the ketoalkyl compound, the keto-oximinoalkyl compound can be isolated conveniently by evaporating the volatile components of the mixture under reduced pressure. When the reaction is carried out in an alkaline medium, the keto-oximinoalkyl compound can be isolated readily by washing the reaction mixture with aqueous acid, subsequently drying the washed water-insoluble portion and evaporating under reduced pressure any volatile components which may be present. The N-(2-keto - 3 - oximinoalkyl) - p - aminobenzoate compound is thus generally recovered as a viscous yellow sirup which is sufficiently pure for most purposes.

The reaction of 2,4,5-triamino-6-hydroxypyrimidine with an N-(2-keto-3-oximinoalkyl)-p-aminobenzoate compound is carried out readily by mixing the substances together, e. g., in glacial acetic acid, preferably with the addition of anhydrous sodium acetate, and allowing the mixture to stand, e. g. at room temperature for about 30 minutes, and then heating under reflux, e. g. for about 2 hours or longer. The 2,4,5-triamino-6-hydroxypyrimidine can be used in the form of its dihydrochloride for greater ease in handling, if desired. The reaction is preferably carried out under an atmosphere of nitrogen or other inert gas to prevent the formation of undesirable oxidation products. The reaction conditions can be varied considerably from those mentioned and such variations are contemplated by the invention.

Following the heating step the reaction mixture can be worked up by distilling the acetic acid under reduced pressure and washing the residue with water to remove inorganic salts and any remaining acetic acid. The N-((2-amino-4-hydroxy - pteridyl) - methyl) - p - aminobenzoate compound is thus obtained as a highly colored residue. The compound thus obtained can be converted directly and without further purification by hydrolysis, in the case of esters, and by cleavage of the arylsulfonyl radical from the molecule, to products containing a substantial proportion of pteroic acid or a pteroyl glutamic acid, depending upon the absence or presence of glutamic acid residues in the keto-oximinoalkyl compound.

An N-(2-ketoalkyl)-p-aminobenzoate compound (II) useful as a starting compound in the method of the present invention can be prepared as described and claimed in concurrently filed copending application, Serial No. 180,501, by first reacting a 1,2-epoxyalkane (V) having the formula

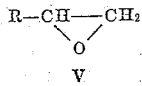

1,2-epoxyalkane with an N-(arylsulfonyl)-p-aminobenzoate ester compound (VI) having the formula

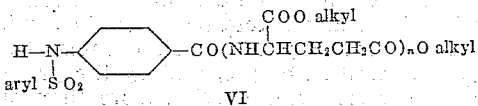

N-(arylsulfonyl)-p-aminobenzoate ester compound to form an N-(2-hydroxyalkyl)-p-aminobenzoate ester compound (VII) having the formula

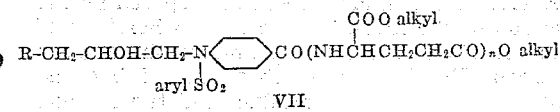

N-(2-hydroxyalkyl)-p-aminobenzoate ester compound and subsequently oxidizing the hydroxyalkyl compound, e. g. with chromic anhydride in glacial acetic acid. Hydrolysis to the free acid can be effected either before or after oxidation. An alternate method by which the oxidation can be carried out using an aqueous acid solution of a dichromate is described and claimed in concurrently filed copending application, Serial No. 180,507. N-(Arylsulfonyl)-p-aminobenzoate ester compounds (VI) which can be employed with the production of the corresponding intermediate and final compounds of the process include the alkyl N-(arylsulfonyl)-p-aminobenzoates, the dialkyl N'-N-(arylsulfonyl)-p-aminobenzoyl-glutamates, the alkyl N'-(N-arylsulfonyl)-p-aminobenzoyl)-glutamyl-glutamates having up to 7 glutamic acid residues in the molecule and the corresponding free acids.

Certain of the N-(arylsulfonyl)-p-aminobenzoate compounds are described and claimed in copending application Serial No. 41,888, filed July 31, 1948. They can be prepared readily as described therein by reacting an arylsulfonyl halide with p-aminobenzoic acid, N'-(p-aminobenzoyl)-glutamic acid, or an N'-(p-aminobenzoyl)-glutamyl-glutamic acid having up to 7 glutamic acid residues in the molecule or with an alkyl ester thereof. N-(Arylsulfonyl)-p-aminobenzoate compounds which are esters can be hydrolyzed readily to the free acids with alkalies and the free acids can be esterified in conventional manner.

Esters which can be used as starting compounds in the process of the invention with the production of the corresponding ester intermediates, include the methyl, ethyl, n-propyl, iso-propyl, butyl, amyl, hexyl, nonyl and many other alkyl esters. As a matter of convenience alkyl esters containing less than about 8 carbon atoms in the alkyl radical, preferably the ethyl esters, are used in the process, although insofar as is known any alkyl ester can be used.

Although starting compounds containing substantially any arylsulfonyl radical can be used in the process of the invention and in the preparation of the corresponding arylsulfonyl intermediates and final products, the preferred starting materials and intermediate compounds are those containing the p-toluenesulfonyl radical due to the ready availability of the p-toluenesulfonyl halides and to the generally crystalline nature of the p-toluenesulfonyl derivatives of compounds with which the present invention is concerned. Furthermore, it appears that the p-toluensulfonyl radical can frequently be removed from the compounds involved herein e. g. by splitting with hydrogen bromide as mentioned previously, somewhat more readily and with the formation of a smaller proportion of undesirable by-products than in the case of some of the other arylsulfonyl radicals. The invention is, however, not limited to compounds containing the p-toluenesulfonyl radical and compounds containing other arylsulfonyl radicals, such as the o-toluenesulfonyl, naphthalenesulfonyl, methylnaphthalenesulfonyl radicals and the like, can be used if desired.

It should also be mentioned that compounds containing arylsulfonyl radicals having non-hydrocarbon substituents can be used in the process and the corresponding intermediate and final compounds prepared, provided only that the substituent is non-reactive under the reaction conditions. Such non-reactive substituents include chlorine, bromine, and the methoxy, phenoxy, nitro and other radicals.

Although R is the formulae given represents hydrogen or any alkyl radical the preferred compounds are those wherein R is hydrogen and the invention has been described with particular reference thereto. Among the alkyl radicals that can be used in the process, if desired, are the methyl, ethyl, n-propyl, iso-propyl, n-butyl, tert.-butyl and octyl radicals as well as many others.

Certain advantages of the invention are apparent from the following examples which are given by way of illustration only and are not to be construed as limiting.

*Example 1.—Diethyl N'-(N-(p-toluenesulfonyl)-p-aminobenzoyl)-glutamate*

Thirty and nine-tenths grams of p-toluenesulfonyl-p-aminobenzoyl chloride and 23.9 grams of diethyl 1(+)-glutamate hydrochloride were dissolved in 300 milliliters of ethylene dichloride and the solution cooled to between 0° and 10° C. The cold solution was stirred vigorously and 22.3 grams of triethylamine in 72 milliliters of ethylene dichloride was added slowly over a period of about 20 minutes. The temperature of the mixture was held between 10° and 20° C. during the addition of the triethylamine and the mixture then allowed to stand at room temperature for one hour. The mixture was then washed successively with water, dilute hydrochloric acid, saturated aqueous sodium bicarbonate and finally with water. The colorless solution thus obtained was dried with anhydrous sodium sulfate and naphtha was added until the solution became opalescent. The mixture was then cooled to cause crystallization and filtered. The crystals, after drying, consisted of 36 grams of diethyl N'-(N-(p-toluenesulfonyl)-p-aminobenzoyl)-1-glutamate melting at 124° to 126° C.

*Example 2.—Diethyl N'-(N-(2-hydroxypropyl)-N-(p-toluenesulfonyl)-p-aminobenzoyl)-glutamate*

A mixture of 6.38 grams of propylene oxide, 47.7 grams of diethyl N'-(N-(p-toluenesulfonyl)-p-aminobenzoyl)-glutamate and 10 drops of anhydrous pyridine was heated under pressure at 130° C. for 2 hours. The reaction mixture was then cooled to room temperature, 400 milliliters of benzene were added and the resulting benzene solution was washed with 50 milliliters of water and 50 milliliters of dilute hydrochloric acid and then dried. Removal of the solvent under reduced pressure gave a non-crystalline solid residue of diethyl N'-(N-(2-hydroxypropyl)-N-(p-toluenesulfonyl)-p-aminobenzoyl)-glutamate.

In a similar manner, and using 1,2-epoxy-n-butane or 1,2-epoxy-4-methyl-n-pentane in place of 1,2-epoxypropane, there are formed diethyl N'-(N-(2-hydroxy-n-butyl)-N-(p-toluenesulfonyl)-p-aminobenzoyl)-glutamate and diethyl N'-(N-(2-hydroxy-4-methyl-n-pentyl)-N-(p-toluenesulfonyl)-p-aminobenzoyl)-glutamate, respectively, which, upon hydrolysis, give the corresponding acids.

The use of ethyl N-(benezenesulfonyl)-p-aminobenzoate or of triethyl N'-(N-(p-chlorobenzenesulfonyl)-p-aminobenzoyl)-glutamyl-glutamate in place of diethyl N'-(N-(p-toluenesulfonyl)-p-aminobenzoyl)-glutamate leads, in analogous manner, to the formation of ethyl N-(2-hydroxypropyl)-N-(benzenesulfonyl)-p-aminobenzoate or triethyl N'-(N-(2-hydroxypropyl)-N-(p-chlorobenzenesulfonyl)-p-aminobenzoyl)-glutamyl-glutamate, respectively. These esters, upon hydrolysis with dilute alcoholic sodium hydroxide, are converted to N-(2-hydroxypropyl)-N-(benzenesulfonyl)-p-aminobenzoic acid and N'-(N-

(2-hydroxypropyl) - N - (p-chlorobenzenesulfonyl)-p-aminobenzoyl)-glutamyl-glutamic acid, respectively. The free acids mentioned, upon esterification with an alkanol or with other alkyl ester-forming agents, are converted to the corresponding alkyl esters.

Upon treating the 2-hydroxyalkyl compounds mentioned which are arylsulfonyl derivatives with hydrogen bromide according to the procedure described in the copending application previously referred to, the arylsulfonyl radical is split from the molecule leaving the corresponding 2-hydroxyalkylamino compound. The latter, upon reaction with an arylsulfonyl halide in substantially conventional fashion, are converted readily to the corresponding arylsulfonyl derivatives of the amine.

*Example 3.—Diethyl N'-(N-(2 - ketopropyl) - N- (p - toluenesulfonyl) - p - aminobenzoyl) - glutamate*

The crude diethyl N'-(N-(2-hydroxypropyl)-N-(p-toluenesulfonyl)-p-aminobenzoyl)-glutamate obtained in Example 2 was dissolved in 400 milliliters of benzene and the solution was added with vigorous stirring to a solution consisting of 52.6 grams of potassium dichromate, 230 milliliters of water, 38 milliliters of acetic acid and 69 milliliters of sulfuric acid. The mixture was stirred vigorously at 20° to 25° C. for about 2½ hours, cooled and the benzene and aqueous layers separated. The aqueous layer was extracted twice with 100-milliliter portions of benzene and then discarded, the benzene extracts being added to the benzene layer from the reaction mixture. The combined benzene solutions were washed three times with 250-milliliter portions of water, once with 100 milliliters of saturated aqueous sodium bicarbonate solution, twice with 250-milliliter portions of water and once with 100 milliliters of saturated aqueous sodium chloride solution. The washed benzene solution was then dried and the solvent distilled under reduced pressure. The residue was dissolved in hot iso-propanol and the solution allowed to crystallize at room temperature. The mixture was filtered and the crystals dried. There were thus obtained 34.5 grams of crude diethyl N'-(N-(2-ketopropyl)-N-(p - toluenesulfonyl) - p - aminobenzoyl) - glutamate which melted at 88° to 130° C. Recrystallization of the crude ketone raised its melting point to 99° to 125° C.

In an alternate procedure, diethyl N'-(N-(2-hydroxypropyl)-N-(p-toluenesulfonyl) - p - aminobenzoyl)-glutamate and a small excess over the theoretical amount of chromic anhydride are dissolved in glacial acetic acid and the mixture allowed to stand for several hours with occasional agitation at about 5° to 10° C. The mixture is then stirred with ether and filtered. The ethereal solution is washed with water and aqueous bicarbonate, dried and the ether evaporated under reduced pressure. Diethyl N'-(N-(2-ketopropyl) - N - (p - toluenesulfonyl) -p-aminobenzoyl)-glutamate is thus obtained as a yellowish viscous residue which can be purified as previously described.

Oxidation in a similar manner of diethyl N'-(N-(2-hydroxy-n-butyl) - N - (p - toluenesulfonyl)-p-aminobenzoyl)-glutamate, diethyl N'-(N-(2 - hydroxy-4-methyl-n-pentyl)-N-(p-toluenesulfonyl)-p - aminobenzoyl) - glutamate, N'-(N-(2-hydroxy-n-butyl)-N - (p-toluenesulfonyl)-p-aminobenzoyl)-glutamic acid, N-(2-hydroxypropyl)-N-(benzenesulfonyl)-p-aminobenzoic acid, ethyl N-(2-hydroxypropyl) - N - (benzenesulfonyl)-p-aminobenzoate, triethyl N'-(N-(2 - hydroxypropyl) - N-(p-chlorobenzenesulfonyl)-p-aminobenzoyl) - glutamyl-glutamate and N'-(N-(2-hydroxypropyl) - N-(p-chlorotoluenesulfonyl)-p-aminobenzoyl)-glutamyl-glutamic acid gives diethyl N'-(N-(2-keto-n-butyl) - N-(p-toluenesulfonyl)-p-aminobenzoyl)-glutamate, diethyl N'-(N - (2 - keto-4-methyl-n-pentyl)-N-(p-toluenesulfonyl)-p-aminobenzoyl) - glutamate, N' - (N-(2-keto-n-butyl) -N-(p-toluenesulfonyl) - p-aminobenzoyl)-glutamic acid, N-(2-ketopropyl) - N-(benzenesulfonyl) - p - aminobenzoic acid, ethyl N-(2-ketopropyl)-N-(benzenesulfonyl)-p-aminobenzoate, triethyl N'-(N-(2 - ketopropyl - N - (p-chlorobenzenesulfonyl) - p - aminobenzoyl)-glutamyl-glutamate and N'-(N-(2-ketopropyl) - N-(p - chlorotoluenesulfonyl) - p - aminobenzoyl)-glutamyl-glutamic acid, respectively.

*Example 4. — Diethyl N'-(N-(2-keto-3-oximinopropyl)-N-(p-toluenesulfonyl) - p - aminobenzoyl)-glutamate*

A mixture of 1.0 gram of diethyl N'-(N-(2-ketopropyl)-N-(p-toluenesulfonyl)-p-aminobenzoyl)-glutamate, 15 milliliters of anhydrous diethyl ether saturated with hydrogen chloride and 0.23 milliliter of n-butyl nitrite was stirred at room temperature for 22 hours and the volatile components then volatilized under reduced pressure. There was thus obtained 1.05 grams of diethyl N'-(N - (2-keto-3-oximinopropyl)-N-(p-toluenesulfonyl)-p-aminobenzoyl-glutamate as a viscous yellow oil.

Other alkyl nitrites, such as ethyl nitrite, propyl nitrite and amyl nitrite when reacted with diethyl N'-(N-(2-ketopropyl)-N-(p - toluenesulfonyl)-p-aminobenzoyl)-glutamate in the manner just described lead to the formation of the same diethyl N'-(N-(2-keto-3-oximinopropyl) - N-(p-toluenesulfonyl)-p-aminobenzoyl)-glutamate.

In similar fashion other esters, such as diethyl N' - (N - (2 - keto - n - butyl) - N - (p - toluenesulfonyl) - p - aminobenzoyl) - glutamate, diethyl N' - (N - (2 - keto - 4 - methyl - n - pentyl) - N - (p - toluenesulfonyl) - p - aminobenzoyl)-glutamate, ethyl N-(2-ketopropyl)-N-(benzenesulfonyl)-p-aminobenzoate and triethyl N'-(N-(2 - ketopropyl) - N - (p - chlorobenzenesulfonyl) - p - aminobenzoyl) - glutamyl - glutamate, are reacted with butyl nitrite to form diethyl N' - (N - (2-keto - 3 - oximino - n - butyl) - N - (p - toluenesulfonyl) - p - aminobenzoyl)-glutamate, diethyl N'-(N-(2-keto-3-oximino-4-methyl - n - pentyl) - N - (p - toluenesulfonyl)-p-aminobenzoyl)-glutamate, ethyl N-(2-keto-3-oximinopropyl) - N - (benzenesulfonyl) - p-aminobenzoate and triethyl N'-(N-(2-keto-3-oximinopropyl)-N-(p - chlorobenzenesulfonyl)-p-aminobenzoyl)-glutamyl-glutamate, respectively.

*Example 5.—Diethyl N'-(N-(2-keto-3-oximinopropyl)-N-(p - toluenesulfonyl)-p-aminobenzoyl)-glutamate*

A mixture of 1.0 gram of diethyl N'-(N-(2-ketopropyl) - N - (p - toluenesulfonyl) - p - aminobenzoyl)-glutamate, 0.23 milliliter of n-butyl nitrite, 0.13 gram of sodium methoxide and 15 milliliters of benzene was stirred at room temperature for 20 hours under an atmosphere of nitrogen. The benzene solution was then extracted with an equal volume of dilute aqueous hydrochloric acid, then with an equal volume of water and dried. Upon volatilization of the solvent under reduced pressure there remained 990 mg. of diethyl N'-(N-(2-keto-3-oximinopropyl)-N - (p - toluenesulfonyl) - p - aminobenzoyl)-glutamate as a viscous, yellow oily residue.

*Example 6.—N'-(N-(2 - keto-3-oximinopropyl)-N - (p - toluenesulfonyl) - (p - aminobenzoyl)-glutamic acid*

N' - (N - (2-keto-3-oximinopropyl) - N - (p-toluenesulfonyl)-p-aminobenzoyl)-glutamic acid is prepared substantially as by the method of Example 4 by treating N'-(N-(2-ketopropyl)-N-(p - toluenesulfonyl)-p-aminobenzoyl)-glutamic acid with n-butyl nitrite in ethereal hydrogen chloride. The product is recovered by volatilizing the low-boiling constituents of the mixture under reduced pressure.

In similar fashion other acids such as N'-(N-(2 - keto - n - butyl) - N - (p - toluenesulfonyl) - p - aminobenzoyl) - glutamic acid, N-(2-ketopropyl) - N - (benzenesulfonyl) - p - aminobenzoic acid, and N' - (N - (2 - ketopropyl) - N - (p-chlorobenzenesulfonyl) - p - aminobenzoyl)-glutamyl-glutamic acid are reacted with butyl nitrite to form N' - (N - (2 - keto-3-oximino-n-butyl) - N - (p - toluenesulfonyl) - p - aminobenzoyl)-glutamic acid, N-(2-keto-3-oximinopropyl) - N - (benzenesulfonyl) - p - aminobenzoic acid and N'-(N-(2-keto-3-oximinopropyl)-N - (p - chlorobenzenesulfonyl) - p - aminobenzoyl)-glutamyl-glutamic acid, respectively.

*Example 7.—Diethyl N' - (N - ((2 - amino-4-hydroxy-6-pteridyl)-methyl)-N-(p - toluenesulfonyl)-p-aminobenzoyl)-glutamate*

A mixture of 1.05 grams of diethyl N'-(N-(2-keto - 3 - oximinopropyl) - N - (p - toluenesulfonyl) - p - aminobenzoyl)-glutamate, 428 milligrams of 2,4,5-triamino-6-hydroxypyrimidine, 328 milligrams of anhydrous sodium acetate and 15 milliliters of glacial acetic acid was stirred at room temperature for 30 minutes under an atmosphere of nitrogen. The mixture was then heated at its refluxing temperature and the acetic acid finally volatilized under reduced pressure. There was thus obtained a colored residue containing inorganic salts and diethyl N'-(N-((2-amino - 4 - hydroxy - 6 - pteridyl) - methyl) - N - (p-tolenesulfonyl)-p-aminobenzoyl)-glutamate.

In similar fashion 2,4,5-triamino-6-hydroxypyrimidine is condensed with ethyl N-(2-keto-3-oximinopropyl) - N - (benzenesulfonyl) - p-aminobenzoate, N - (2 - keto - 3 - oximinopropyl) - N-(benzenesulfonyl)-p-aminobenzoic acid, triethyl N' - (N - (2 - keto - 3 - oximinopropyl) - N - (p - chlorobenzenesulfonyl) - p - aminobenzoyl)-glutamyl-glutamate, N' - (N - (2 - keto - 3 - oximinopropyl) - N - (p - chlorobenzenesulfonyl) - p - aminobenzoyl) - glutamyl - glutamic acid, diethyl N' - (N - (2 - keto - 3 - oximino - n-butyl) - N - (p - toluenesulfonyl) - p - aminobenzoyl) - glutamate and diethyl N' - (N - (2-keto - 3 - oximino - 4 - methyl - n - pentyl) - N-(p - toluenesulfonyl) - p - aminobenzoyl) - glutamate to form ethyl N-((2-amino-4-hydroxy-6-pteridyl) - methyl) - N - (benzenesulfonyl) - p-aminobenzoate, N - ((2 - amino - 4 - hydroxy - 6-pteridyl) - methyl) - N - (benzenesulfonyl) - p-aminobenzoic acid, triethyl N' - (N - ((2-amino-4 - hydroxy - 6 - pteridyl) - methyl) - N - (p-chlorobenzenesulfonyl) - p - aminobenzoyl)-glutamyl-glutamate, N' - (N-((2 - amino-4-hydroxy - 6 - pteridyl)-methyl) - N - (p-chlorobenzenesulfonyl) - p - aminobenzoyl) - glutamyl-glutamic acid, diethyl N'-(N-((2-amino-4-hydroxy-7-methyl-6-pteridyl) - methyl) - N - (p-toluenesulfonyl) - p - aminobenzoyl) - glutamate and diethyl N'-(N-((2-amino-4-hydroxy-7-isopropyl - 6 - pteridyl) - methyl) - N - (p - toluenesulfonyl) - p - aminobenzoyl) - glutamate, respectively.

*Example 8.—Diethyl N'-((2-amino-4-hydroxy-6 - pteridyl) - methyl) - p - amino - benzoyl) - glutamate*

The crude diethyl N'-(N-((2-amino-4-hydroxy-6 - pteridyl) - methyl) - N - (p - toluenesulfonyl)-p-aminobenzoyl)-glutamate obtained in Example 7 and 0.4 gram of phenol were dissolved in 8 milliliters of a 30 per cent solution of hydrogen bromide in glacial acetic acid. The mixture was allowed to stand at room temperature for 90 minutes and then stirred into 100 milliliters of dry ethyl ether. The solid which separated was recovered by centrifuging and dried. There was thus obtained a light brown residue of diethyl N'(N-((2-amino-4-hydroxy-6-pteridyl)-methyl)-p-aminobenzoyl)-glutamate.

*Example 9.—N'-(N-((2-amino - 4 - hydroxy - 6-pteridyl)-methyl)-p-aminobenzoyl) - glutamic acid*

The dry diethyl N'-(N-((2-amino-4-hydroxy-6-pteridyl)-methyl)-p-aminobenzoyl)-glutamate as obtained in Example 8 was dissolved in a mixture of 5 milliliters of methanol and 15 milliliters of 10 per cent aqueous sodium hydroxide. The solution was allowed to stand at room temperature for one hour and aqueous hydrochloric acid was then added until the mixture was at pH 3.0. The precipitate which formed was collected by filtering and washed with 10 milliliters of water and then with three 7-milliliter portions of acetone and finally dried. There was thus obtained 120 milligrams of N'-(N-((2-amino-4-hydroxy-6-pteridyl)-methyl)-p - aminobenzoyl) - glutamic acid which, upon microbiological assay with *L. casei*, had an activity of of 14.5 per cent of that of the pure natural acid.

*Example 10.—N'-(N-((2-amino - 4 - hydroxy - 6-pteridyl)-methyl)-N-(p-toluene-sulfonyl) - p-aminobenzoyl)-glutamic acid*

Crude N'-(N-(2-keto-3-oximinopropyl)-N-(p-toluenesulfonyl)-p-aminobenzoyl)-glutamic acid as prepared in Example 6 is reacted with 2,4,5-triamino-6-hydroxypyrimidine substantially as by the method of Example 7. There is thus obtained a brownish residue containing inorganic salts and N'-(N-((2-amino-4-hydroxy-6-pteridyl)-methyl)-N-(p - toluenesulfonyl) - p - aminobenzoyl)-glutamic acid. Treatment of the residue with phenol and a glacial acetic acid solution of hydrogen bromide substantially as by the method of Example 8 yields the same N'-(N-((2-amino-4-hydroxy-6-pteridyl) - methyl) - p-aminobenzoyl)-glutamic acid obtained in Example 9.

We claim:

1. The method which includes: reacting a 2-keto-3-oximinoalkyl compound having the formula

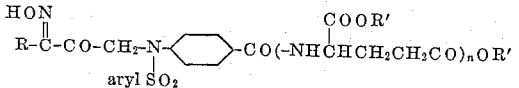

wherein R' is a member of the class consisting of hydrogen and the alkyl radicals, *n* is a member of the class consisting of zero and the positive integer 1 and R is a member of the class consisting of hydrogen and the alkyl radicals with 2,4,5-triamino-6-hydroxypyrimidine to form a compound having the formula:

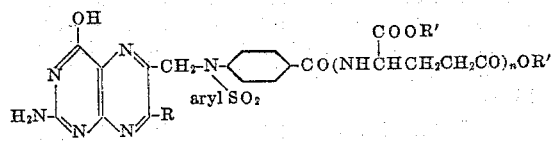

wherein $n$, R and R' have the values given.

2. The method which includes: reacting a 2-keto-3-oximinoalkyl compound having the formula

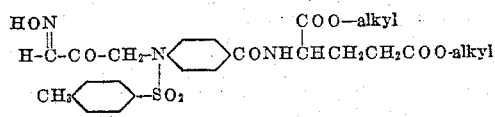

with 2,4,5-triamino-6-hydroxypyrimidine to form a compound having the formula

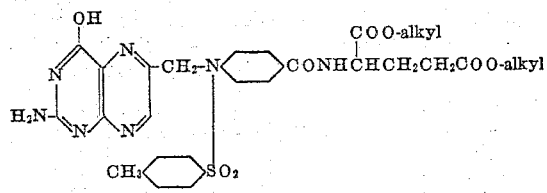

3. The method of claim 1 wherein the 2-keto-3-oximinoalkyl compound is diethyl N'-(N-(2-keto-3-oximinopropyl)-N-(p-toluenesulfonyl)-p-aminobenzoyl)-glutamate.

BARNEY J. MAGERLEIN.
DAVID I. WEISBLAT.

No references cited.